United States Patent
Chan

(10) Patent No.: US 8,111,874 B2
(45) Date of Patent: Feb. 7, 2012

(54) METHOD AND APPARATUS FOR IMAGE CAPTURING

(75) Inventor: Cheng Che Chan, Taipei County (TW)

(73) Assignee: Mediatek Inc., Hsin-Chu (TW)

( * ) Notice: Subject to any disclaimer, the term of this patent is extended or adjusted under 35 U.S.C. 154(b) by 1035 days.

(21) Appl. No.: 11/949,792

(22) Filed: Dec. 4, 2007

(65) Prior Publication Data

US 2009/0141981 A1 Jun. 4, 2009

(51) Int. Cl.
*G06K 9/00* (2006.01)
(52) U.S. Cl. ............ 382/103; 348/208.15; 396/153
(58) Field of Classification Search .............. 382/100, 382/103, 181, 190, 192, 195, 115, 117, 118, 382/209, 203, 206; 348/207.99, 208.14, 348/208.15, 211.9, 361, 267, 700; 396/153, 396/263, 264
See application file for complete search history.

(56) References Cited

U.S. PATENT DOCUMENTS

| 6,608,910 B1 * | 8/2003 | Srinivasa et al. ............ 382/100 |
| 6,678,393 B1 * | 1/2004 | Dunton et al. ............. 382/103 |
| 7,035,440 B2 * | 4/2006 | Kaku ..................... 382/115 |
| 7,177,450 B2 * | 2/2007 | Tajima .................... 382/118 |
| 7,386,170 B2 * | 6/2008 | Ronk et al. ............... 382/190 |
| 2005/0089223 A1 * | 4/2005 | Krumm .................. 382/170 |

FOREIGN PATENT DOCUMENTS

| CN | 1933553 A | 3/2007 |
| TW | M306340 | 2/2007 |
| TW | 200710527 | 3/2007 |

OTHER PUBLICATIONS

English abstract of CN1933553, pub. Mar. 21, 2007.
English translation of Detailed Description of CN1933553, pub. Mar. 21, 2007.
English language translation of abstract of TW M306340 (published Feb. 11, 2007).
English language translation of abstract of TW 200710527 (published Mar. 16, 2007).

* cited by examiner

*Primary Examiner* — Anand Bhatnagar
(74) *Attorney, Agent, or Firm* — Thomas|Kayden

(57) ABSTRACT

An image capturing method is provided, especially adaptable in a camera. First, a composition profile for a picture to be taken, is configured. The composition profile defines the number of objects to be included in the picture, and positions and sizes of each object. Thereafter, a sensor in the camera is enabled to receive an image, and simultaneously, it is determined whether the image satisfies the composition profile. If the image satisfies the composition profile, the image is stored to be the picture.

20 Claims, 3 Drawing Sheets

METHOD AND APPARATUS FOR IMAGE CAPTURING

BACKGROUND OF THE INVENTION

1. Field of the Invention

The invention relates to digital cameras, and in particular, to image capturing methods based on face detection.

2. Description of the Related Art

Face detection is a prevailing technology commonly used for focus control of a digital camera. Conventionally, a digital camera may enable a sensor to obtain an image, and employ a face detection algorithm to identify faces in the image. When one or more faces are identified, the focus of the camera is adjusted to lock on to the faces, such that a sharp picture of faces can be taken. The face detection algorithm may be accomplished through various approaches, such as identification of colors and shapes. Since there is ongoing research in face detection, technique details are not introduced herein.

As known, a typical camera can take photos spontaneously by setting a time clock, so a photographer can setup the count down time and walk into the lens range to wait for the shutter to trigger. However, in the count down mode, it is difficult to control the composition of a picture since there is no photographer behind the camera. People to be photographed may stand in a wrong position because of a lack of bearing. Therefore, an enhanced functionality for autonomic image capturing method is desirable.

BRIEF SUMMARY OF THE INVENTION

An exemplary embodiment of an image capturing method is proposed, particularly adaptable for a camera. A composition profile is configured to define a picture to be taken. The composition profile defines a composition of the picture and the picture includes at least one object. To sense and acquire an image, a sensor in the camera is activated. The image is then analyzed to determine whether the composition profile is satisfied. According to the analysis result, an indication signal is generated. When the image satisfies the composition profile, the image is stored to be the picture.

In an alternative embodiment, the composition profile is configured, and the sensor in the camera is then enabled to sense and acquire an image. Thereafter, the image is analyzed to determine whether the composition profile is satisfied, and the image is directly stored to be the picture upon the composition profile is satisfied.

An embodiment of an image capturing device implementing the method is also provided. A configuration interface is used for inputting a composition profile for a picture to be taken. A capturing module senses and acquires an image when enabled. A processor determines whether the image satisfies the composition profile. If the image satisfies the composition profile, the processor stores the image in a memory device to be the picture. An indicator module is used to generate an indication signal. If the image does not satisfy the composition profile, the processor analyzes misplaced objects in the image, and the indication signal is generated to guide the misplaced objects to meet the composition profile.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
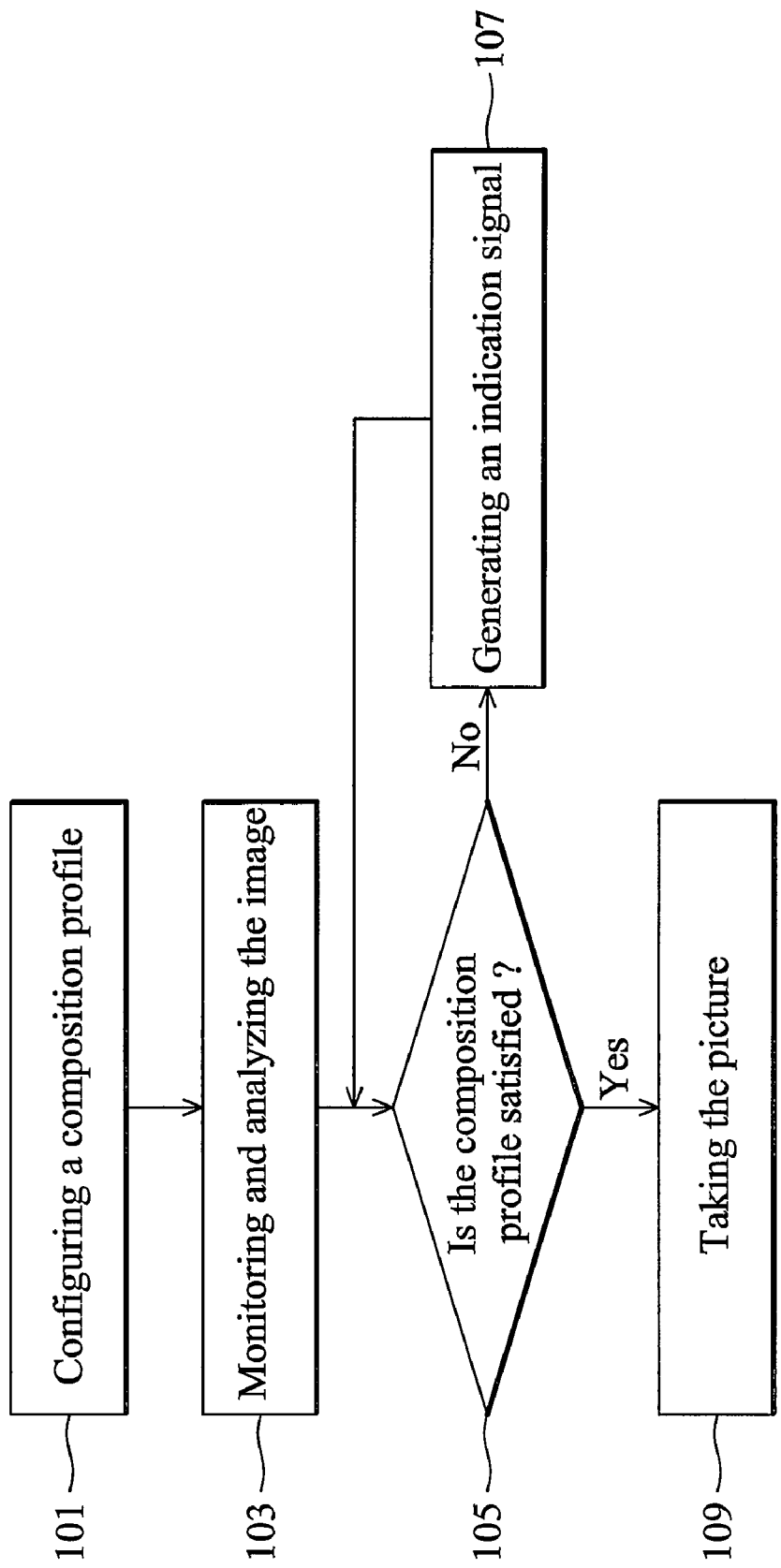
FIG. 1 is a flowchart of an embodiment of autonomic image capturing according to the invention.

In FIG. 1, an embodiment of autonomic image capturing method according to the invention is shown. The object of the invention is to solve the difficulty of composing a picture when the picture is to be taken in autonomic mode. In the invention, the picture is taken based on a composition profile. The procedure starts in step 101, in which an interface is provided to configure the composition profile. The composition profile may define number of objects to be included in the picture, and positions and sizes of each object. The objects may be human faces or combinations of specific colors and geometric shapes. For example, if there are three people to be photographed, the operator can input positions and sizes of the three faces prior to enabling face detection.

In step 103, the camera enters the autonomic mode, during which time a sensor in the camera, such as a Charge-Coupled Device (CCD) or a CMOS image sensor, is activated to sense and acquire an image, and simultaneously, the image is analyzed. If the objects configured in the composition profile are human faces, the image analysis may employ a face detection algorithm to determine the objects. For other objects of specific colors and geometries, different algorithm may be correspondingly utilized.

In step 105, by using variable algorithms, it is determined whether the image satisfies the composition profile. If the image satisfies the composition profile, the camera stores the image in step 109. Otherwise, an indication procedure is activated in step 107 to direct misplaced objects to move to desired positions. Take three people for example, when their faces are detected at predetermined positions as defined in the composition profile, the condition is deemed satisfactory, whereby the shutter is allowed to be triggered to store the picture. If the image is deemed unsatisfactory in step 105, the camera may generate an indication signal to tell each person to move to desired positions.

The indication signal may be one or combinations of signals such as a voice output from a speaker, an LED light indicator, or a screen display on the camera. When a misplaced face is deemed too close or too far from its destined position (judging by size), the indication signal may be "The $n^{th}$ person please move closer/farther." Through such a feedback mechanism, the shutter may be triggered shortly after all people having met their destined position. In practice, when the image is deemed satisfactory for a while such as one or three seconds, the camera may output a signal like "ready, cheers!" before triggering the shutter. In this way, the camera can acquire a picture of desired composition by interacting with the people being photographed.

Generally, face sizes vary with different people, and their positions can not be strictly static since they are alive. To increase flexibility, the camera allows for some errors when matching the composition. Thus, tolerable error ranges of size and position of each object are also configurable parameters to be defined when establishing the composition profile. Further, step 107 may be optional since users may want to take the picture directly if it is determined that the picture satisfies the composition profile such as the number of objects and positions thereof in step 105.

Figure 2:
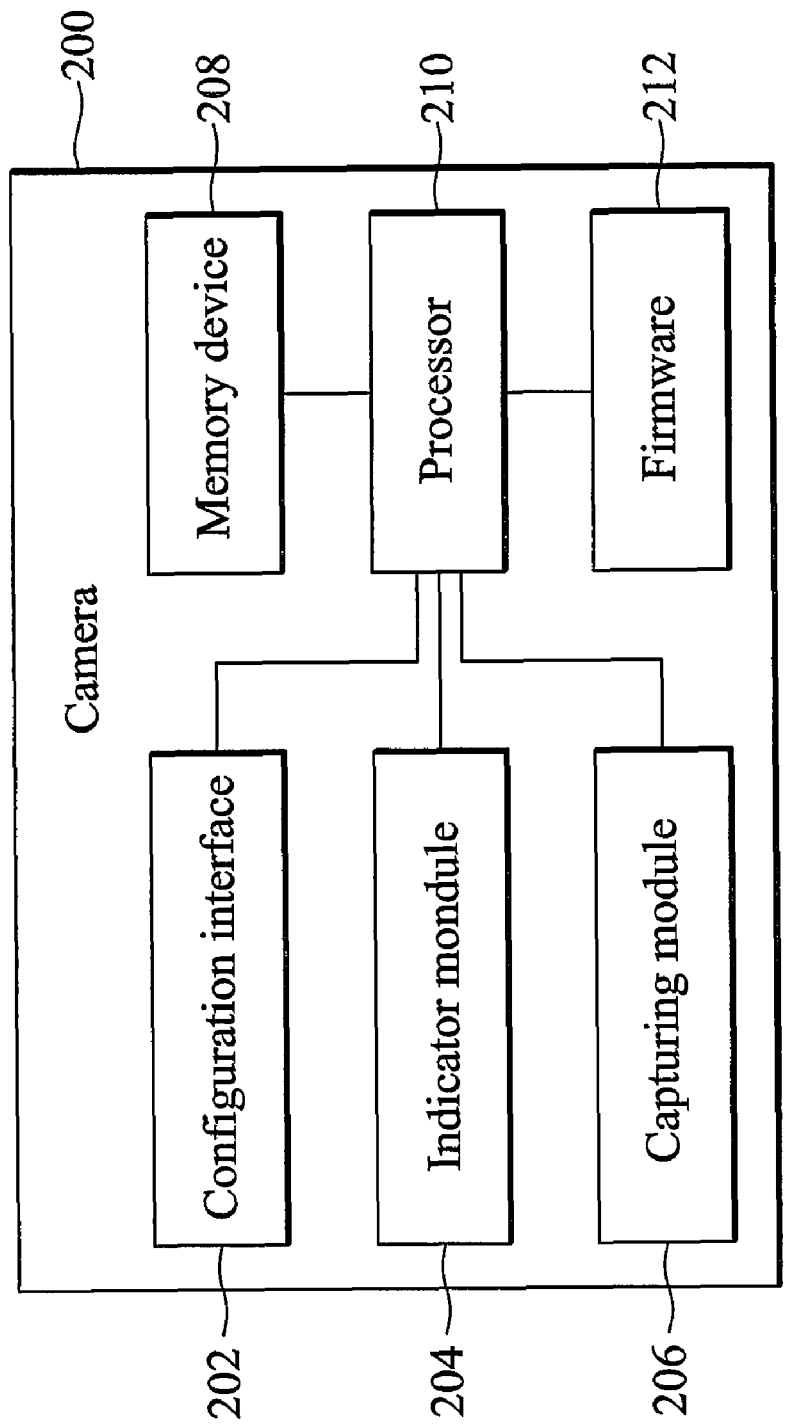
FIG. 2 shows an embodiment of a camera employing the image capturing method according to the invention.

In FIG. 2, an embodiment of a camera employing the image capturing method according to the invention is shown. The camera 200 comprises a configuration interface 202 for constructing the composition profile. The configuration interface 202 may be a touch panel, allowing the composition to be established by direct sketching thereon. The capturing module 206 may comprise a lens, a shutter and a CCD capable of acquiring an image when enabled. The memory device 208 is where pictures are stored. The image capturing method may be implemented as a program stored in the firmware 212 and executed by the processor 210.

The camera 200 further comprises an indicator module 204, which is one or combinations of indicators such as a display, a speaker or a plurality of LEDs. As described, the indication signal may be voice, light, screen display or combinations thereof generated by the indicator module 204. In addition to voice indication, symbol indications such as arrows, may also be provided by the LEDs to indicate a specific person to move to a desired position. Some cameras may have LCDs that flip or reverse so that the LCD can be turned toward the people being photographed. In this case, screen indications are directly provided so that people in the image can adjust themselves to their proper positions.

Figure 3:
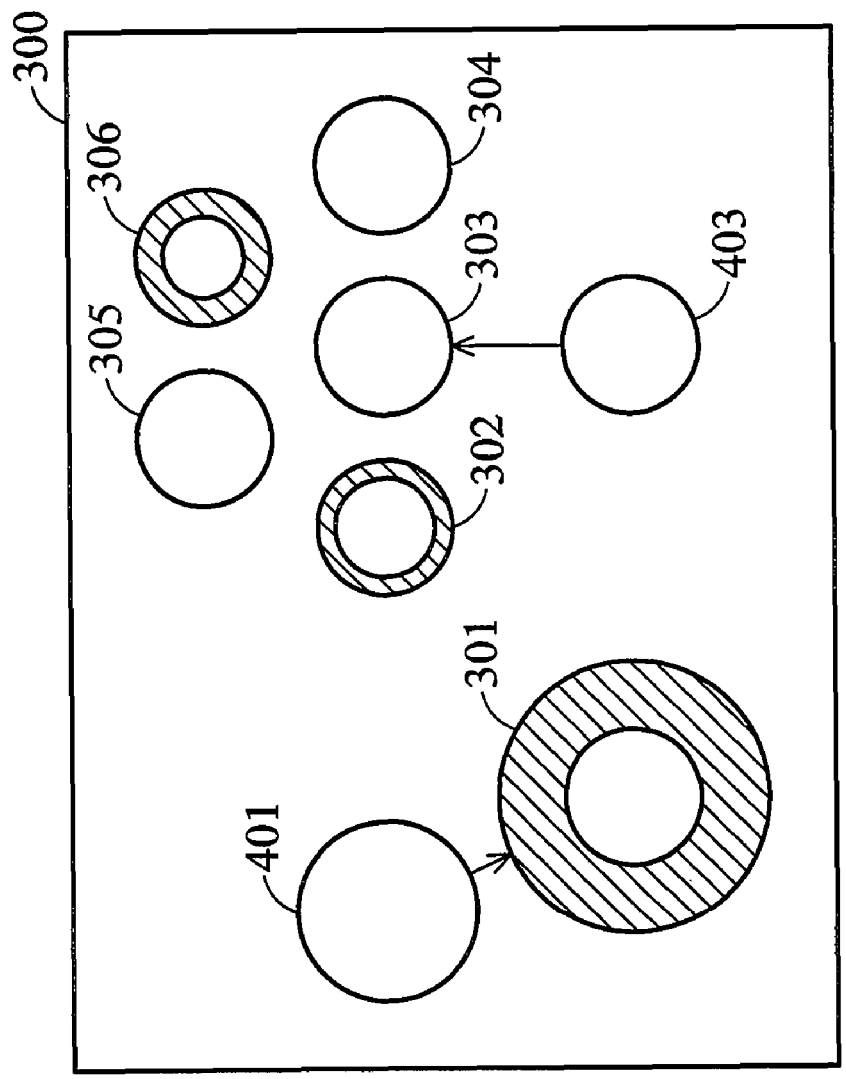
FIG. 3 shows an embodiment of a configuration interface 300 for configuring a composition profile according to the invention.

FIG. 3 shows an embodiment of a configuration interface 300 for configuring a composition profile according to the invention. In the configuration interface 300, six objects 301 to 306 are configured, each defined with different positions and distances. The distance is determined by size, thus a bigger circle means a closer object, and a smaller circle means a farther object. The objects may be faces or other specifically defined geometries, which are identifiable by the camera using identifying programs such as face detection algorithms. The configuration interface 300 may be composed on a touch panel of a camera by direct sketching, or inputted through traditional interfaces such as bottoms or menus. The shadowed regions in the objects 301, 302 and 306 mean tolerable error ranges, whereby any size of face within the ranges are allowable. When the composition profile is set, the camera enters autonomic mode to continuously monitor whether the composition profile is satisfied. If misplaced objects are detected, such as objects 401 and 403, the camera generates indication signals as described above to guide the objects to the desired position. When all objects meet the composition profile for a predetermined time interval, such as one second, the camera automatically says "cheers" before taking the picture. The time interval may also be a configurable parameter which is not limited to one second.

As disclosed in the embodiment of the invention, an effective interaction mechanism is provided using image analysis techniques such as face detection to accomplish autonomic image capturing with desired composition. While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image capturing method for use in a camera, comprising:
    configuring a composition profile for a picture to be taken, wherein the composition profile defines a composition of the picture and the picture includes at least one object;
    enabling a sensor in the camera to sense and acquire an image;
    analyzing the image to determine whether the image satisfies the composition profile;
    generating an indication signal according to the analyzing result, wherein generation of the indication signal comprises guiding the objects to meet the composition profile when the image does not satisfy the composition profile; and
    when the image satisfies the composition profile, storing the image to be the picture.

2. The image capturing method as claimed in claim 1, wherein the indication signal comprises voice, light, screen display or combinations thereof.

3. The image capturing method as claimed in claim 1, wherein:
    the objects comprise human faces; and
    analysis of the image comprises employing a face detection algorithm to determine whether the image satisfies the composition profile.

4. The image capturing method as claimed in claim 1, wherein configuration of the composition profile comprises defining number of the at least one object, position of each object, or size of each object.

5. The image capturing method as claimed in claim 4, wherein configuration of the composition profile comprises defining tolerable error ranges of the size and position of each object.

6. The image capturing method as claimed in claim 1, wherein configuration of the composition profile is performed by sketching on a touch panel.

7. The image capturing method as claimed in claim 1, wherein storage of the picture comprises:
    if the determination result indicates the image satisfies the composition profile for a predetermined time, storing the image to be the picture.

8. An image capturing method for use in a camera, comprising:
    configuring a composition profile for a picture to be taken, the composition profile defining a number of objects to be included in the picture, a position of each object, and a size of each object;
    enabling a sensor in the camera to sense and acquire an image;
    analyzing the image to determine whether the image satisfies the composition profile; and
    if the image satisfies the composition profile, storing the image to be the picture.

9. The image capturing method as claimed in claim 8, wherein the composition profile further defines tolerable error ranges of the size and position of each object.

10. The image capturing method as claimed in claim 8, wherein the composition profile is configured by sketching on a touch panel.

11. The image capturing method as claimed in claim 8, wherein:
    the objects comprise human faces; and
    analysis of the image comprises employing a face detection algorithm to determine whether the image satisfies the composition profile.

12. The image capturing method as claimed in claim 8, wherein the storing storage of the picture comprises:

if the analyzing result indicates the image satisfies the composition profile for a predetermined time, storing the image to be the picture.

13. An image capturing device, comprising:

a configuration interface, for inputting a composition profile for a picture to be taken, the composition profile defining a composition of the picture and the picture includes at least one object;

a capturing module, sensing and acquiring an image when enabled;

a processor coupled to the configuration interface and capturing module, analyzing the image to determine whether the image satisfies the composition profile;

a memory device coupled to the processor, storing the image in the memory device to be the picture the image satisfies the composition profile; and an indicator module coupled to the processor, generating an indication signal, wherein if the image does not satisfy the composition profile, the processor analyzes misplaced objects in the image, and the indication signal is generated to guide the misplaced objects to meet the composition profile.

14. The image capturing device as claimed in claim 13, wherein:

the indicator module comprises a display, a speaker or lamps; and the indication signal is voice, light, screen display or combinations thereof.

15. The image capturing device as claimed in claim 13, further comprising a firmware coupled to the processor to provide a face detection algorithm, wherein:

the objects comprise human faces; and the processor employs the face detection algorithm to determine whether the image satisfies the composition profile.

16. The image capturing device as claimed in claim 13, wherein the composition profile defines number of the at least one object, position of each object, or size of each object.

17. The image capturing device as claimed in claim 16, wherein the composition profile further defines tolerable error ranges of the size and position of each object.

18. The image capturing device as claimed in claim 13, wherein the configuration interface is a touch panel.

19. The image capturing device as claimed in claim 13, wherein the processor counts duration of how long the image stays in a condition of satisfying the composition profile; and if the duration is longer than a predetermined time, the processor stores the image to be the picture.

20. The image capturing device as claimed in claim 13, wherein the indication signal is generated to guide the objects to meet the composition profile.

\* \* \* \* \*